United States Patent [19]

Seney

[11] Patent Number: 4,871,154

[45] Date of Patent: Oct. 3, 1989

[54] WORK HOLDING DEVICE FOR HANDICAPPED PERSONS

[76] Inventor: John S. Seney, P.O. Box 152, Sugarloaf Key, Fla. 33044

[21] Appl. No.: 261,734

[22] Filed: Oct. 24, 1988

[51] Int. Cl.[4] ............................................. B23Q 1/04
[52] U.S. Cl. ..................................... 269/97; 269/221; 269/246
[58] Field of Search ................... 269/254 CS, 71, 329, 269/240, 244, 246, 251, 221–223, 97

[56] References Cited

U.S. PATENT DOCUMENTS

| | | |
|---|---|---|
| 1,397,409 | 11/1921 | Duwelius . |
| 1,499,989 | 7/1924 | Lehmann . |
| 2,658,415 | 11/1953 | Barowsky . |
| 2,885,686 | 5/1959 | Giaimo . |
| 3,063,708 | 11/1962 | Wollenhaupt ........................ 269/222 |
| 3,530,994 | 9/1970 | Bourassa et al. . |
| 3,653,775 | 4/1972 | Ross . |
| 4,135,706 | 1/1979 | Butticci ........................ 269/254 CS |
| 4,738,438 | 4/1988 | Horie et al. ........................ 269/329 |
| 4,770,401 | 9/1988 | Donaldson ........................ 269/225 |

Primary Examiner—Robert C. Watson
Attorney, Agent, or Firm—C. Hercus Just

[57] ABSTRACT

A work holding device to support objects for the use of handicapped persons and, more particularly, persons haivng only one hand, the device being attachable to a wheelchair or similar supporting items upon which a handicapped person may sit or lie and it includes a housing upon or to which objects may be clamped for use by such person. The housing is attached for substantially universal adjustment upon the upper end of a post-like device which is attached to the wheelchair or the like. The device has clamping mechanism operated by a reversible electric motor powered by batteries and switches are included which selectively are actuated either by human breath blowing out or drawing inward for suction or by a switch actuated by a foot of the handicapped person. The device has a monitored and controlled clamping pressure.

24 Claims, 5 Drawing Sheets

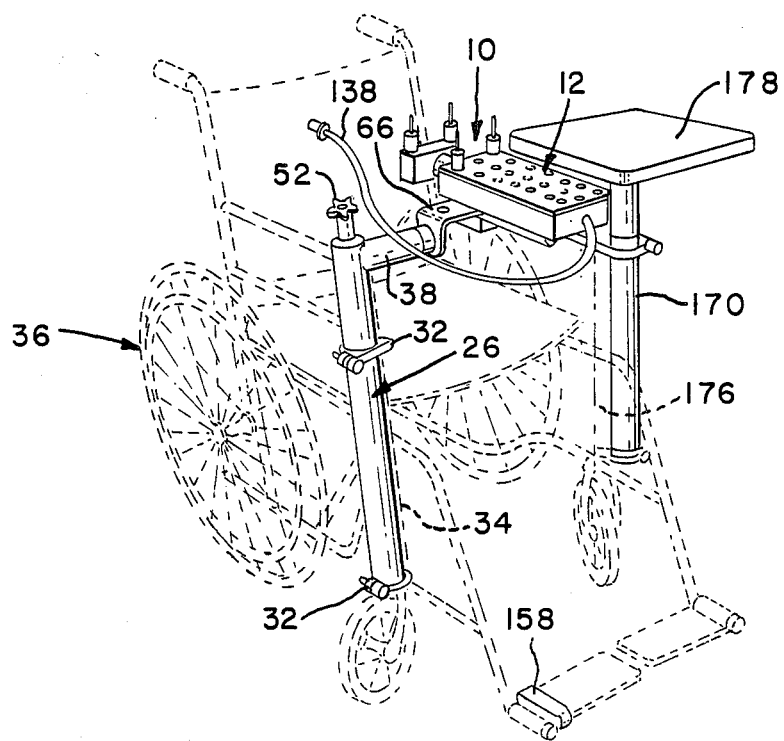
FIG. 1
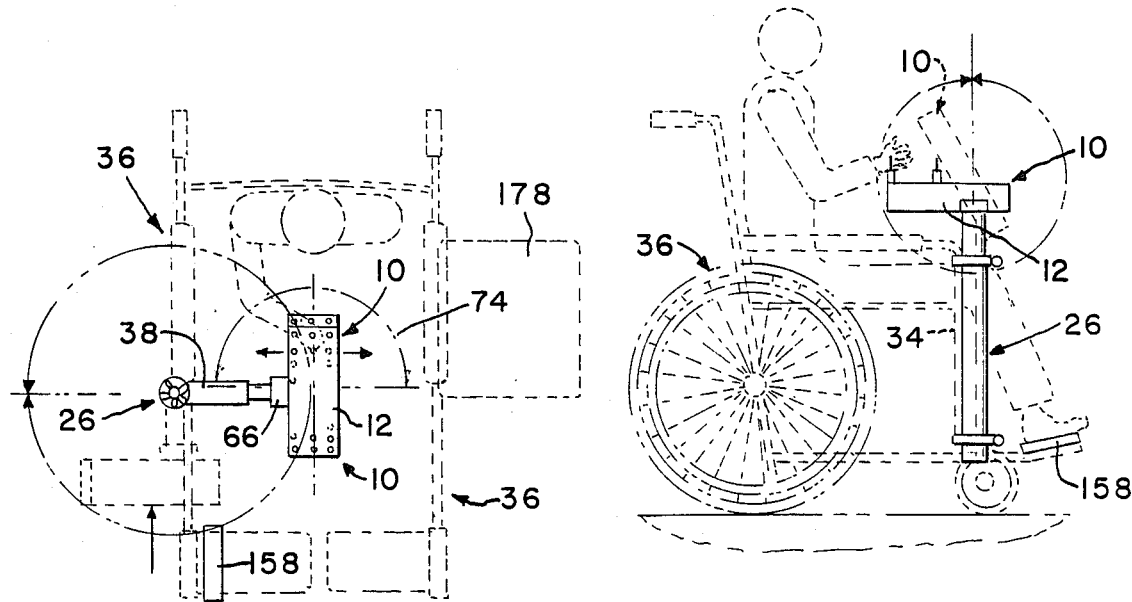
FIG. 2
FIG. 3

WORK HOLDING DEVICE FOR HANDICAPPED PERSONS

BACKGROUND OF THE INVENTION

Attempts have been made previously to provide different structures for use by handicapped people and especially those who have only one usable hand or no hands. One such example is the subject matter of U.S. Pat. No. 2,885,686, dated May 12, 1959 to C. V. Giaimo and in which mechanism is shown that is operated by a small electric motor to effect movements of articulated elements attachable to fingers of a disabled human hand and cause the fingers to be moved to grasp an object, such as a pencil or otherwise. The motor is controlled by a switch adapted to be actuated by human breath through a tube, one end of which is inserted in the mouth of the person.

A later development comprises the subject matter of U.S. Pat. No. 3,653,775, dated April 4, 1972, in the name of James W. Ross, and discloses apparatus attachable to the neck and back of the head of a person and actuated by movement of the head and chin of the person to cause mechanical operation of tools of various kinds through the use of springs, links and the like.

Various prior patents which show different types of gripping or clamping mechanisms per se are shown in the following U.S Pat. Nos.

1,397,409—W. S. Duwelius: Nov. 15, 1921
1,499,989—F. Lehmann: July 1, 1924
2,658,415—N. Barowsky: Nov. 10, 1953
3,530,994—H. A. Bourassa et al: Sept. 29, 1970.

The present invention pertains to use by persons having only one active hand. Such persons have great difficulty in performing simple tasks that require holding an object stationary while using or operating with the objects in a desired work function. Because of this problem, many people give up to hopelessness and despair when they are deprived of one hand, either by accident or disease. Presently, rehabilitation science is helping many people of this type but in many instances, the present technology and rehabilitation equipment is inadequate for them to recover and become substantially self-sufficient persons. The present invention focuses upon solutions to the foregoing problem and field tests currently in progress indicate that even most severely handicapped persons can benefit from use of the present invention.

SUMMARY OF THE INVENTION

It is the principal object of the present invention to provide a work holder or work holding device designed to hold objects of substantially universal shape by employing clamping or positioning members which engage such objects in which the person is interested and, within reasonable and practical limits, objects as large as twelve inches square or in diameter are easily held firmly for use by the person. The holder is adjustable by the handicapped person to support the object at a desired angle and elevation and once the position of the object being held is established, the person selectively can operate either a breath control switch or a foot-operated switch to initiate movement of a preferably battery-operated electric motor which causes clamping members of several types which are movable relatively to and from clamping position.

Another object of the invention is to support the clamping mechanism preferably upon the upper end of post-like means and the connection of the device to said post-like means comprises connections, arms and locking mechanism which afford substantially universal positioning of the work holding device with respect to support means upon which a handicapped person is seated or can lie and the single usable hand of the person can work upon or with an object clamped or secured to the work holding device.

A further object of the invention is to provide a substantially stationary clamping member in the work holding device on a base member and a secondary member supports an additional clamping device, and an electric motor is supported preferably by said base member to operate interengaging threaded members which effect movement of the secondary member relative to the base member and thus permit clamping of an object between the clamping devices respectively attached to said base and secondary members.

One further object of the invention is to provide mode control means which is selectively operable by a handicapped person to effect actuation of the aforementioned motor either by a breath-controlled switch or a foot-controlled switch, the breath-controlled switch including a tube of which one end is inserted in the mouth of the person and either by drawing in on the tube or blowing outward therethrough, the switch is actuated to cause movement of the reversible electric motor and thereby effect movement of one of said clamping means toward or from the other and thereby effect a clamping action or release thereof.

A still further object of the invention is to utilize a preferably battery-operated electric motor of selected power which is capable of effecting movement of one clamping device toward the other and exert a predetermined pressure, and the mechanism further includes hand-operated mechanism to actuate the clamping movement of one of said devices at a still greater pressure toward the other clamping device, when such additional force is necessary.

One further object of the invention is to provide a housing in which the aforementioned electric motor and interengaging threaded members are supported and coaxial tubes, one of which is contained in said housing, supports the other tube for movement longitudinally of the axis of said coaxial tube which effects guiding of the movable clamping device toward the relatively fixed clamping device and the cooperating lug and slot means respectively provided in said tube prevent relative rotation therebetween.

Still another object of the invention is to provide said aforementioned post-like vertical support in the form of a pair or coaxial tubes, one of which is securely clamped to a leg of a wheelchair or otherwise, and the other tube is vertically movable to a desired adjustable position of the upper end thereof to which a horizontal arm is connected at one end and the opposite end of said arm supports the work holding device preferably for rotatable adjustment about a horizontal axis and the work holding device preferably is connected to the outer end of said arm by pivot means permitting adjustment of the work holding device about a substantially vertical axis and thereby resulting in substantially universal positioning of the work holding device with respect to the vertical post-like support and all of said adjustable means having clamping mechanism to secure the work holding device in a desired adjusted position. Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a perspective view of a wheelchair, shown in phantom, to which a work holding device embodying the present invention is illustrated in full lines and attached to certain portions of the wheelchair.

FIG. 2 is a top plan view of the wheelchair and work holding device shown in FIG. 1, and in which view curved lines and arrows illustrated possible movements of the work holding device with respect to the mechanism supporting the same.

FIG. 3 is a side view of the wheelchair and work holding device shown in FIGS. 1 and 2, and said view including additional curved lines and arrows illustrating possible movements of the work holding device for selected positioning thereof, the chair in FIGS. 2 and 3 also being in phantom, while the work holding device and its supporting means is shown in full lines.

DETAILED DESCRIPTION OF THE PREFERRED EMBODIMENTS OF THE INVENTION

Figure 4:
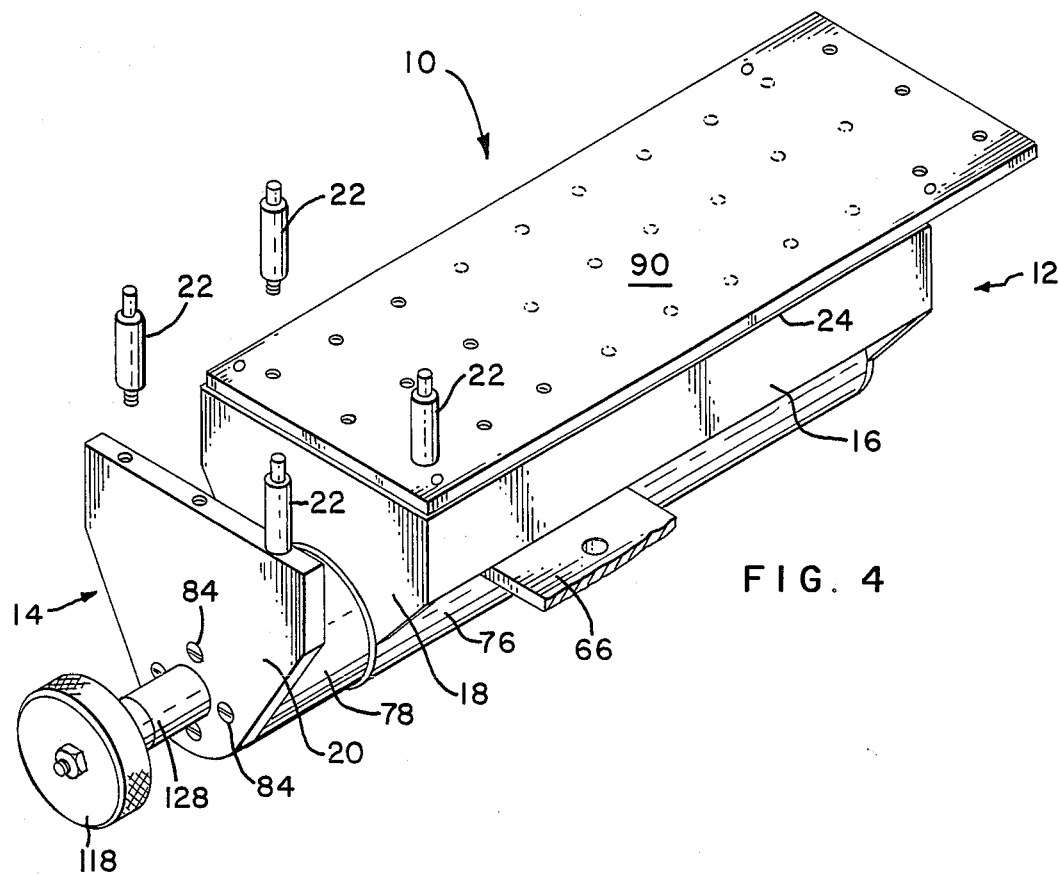
FIG. 4 is a perspective view of the work holding device per se, part of the same being fragmentary and the view also showing certain work-engaging members separated from the openings in which they are positioned.

As referred to hereinabove and as shown in the drawings, the present invention comprises a work holding device 10 which, as best shown in FIG. 4, comprises a base member 12 which is associated with a secondary member 14. The base member 12 is in the form of a housing 16 and the upper surface thereof is planar and comprises a support for objects, not shown, to be supported thereon and clamped, when desired, by means described hereinafter. Primary clamping means respectively comprise a face 18 on one end of housing 16 and a plate-like clamping member 20 which comprises part of the secondary member 14 and has a planar innerface parallel to the face 18 on the base member 12. Such clamping means is highly useful for clamping various objects and items between said parallel faces. In addition, supplemental clamping members 22 may be attached respectively to the upper edge of clamping member 20 and also to the planar upper surface 24 of base member 12. Supplemental clamping members 22 conveniently may comprise short rods around which actual surface engaging means in the form of tubes of limited compressibility extend in order to prevent damage to any objects being clamped between the members 22 respectively on the base and secondary members. The supplemental clamping members are adjustably positionable respectively, such as by threaded ends and sockets, upon the respective base and secondary members and for purposes of practicality, objects as much as twelve or more inches in side dimensions or diameter may be clamped between said various members.

Without limitation thereto and for purposes of illustrating the range of use of the present invention, the work holding device 10 is movable to or away from a handicapped patient seated upon a wheelchair or lying in a bed, it is movable up or down, to right or left, and is changeable to various angles best suited for a patient or handicapped person. Specifically, the device is adapted for holding and positioning means with respect to opening jars or bottles, and other forms of containers, holding books, clamping a clock while winding the same, holding various types of containers while filling the same, fixedly supporting pans and dishes while being cleaned, performing all types of necessary support while sawing, sanding, painting, or otherwise working upon various surfaces or objects, supporting fabrics while sewing the same or embroidering or darning certain objects, supporting mechanical or electrical objects while working thereon, holding mirrors and many other functions not necessary to mention.

Figure 10:
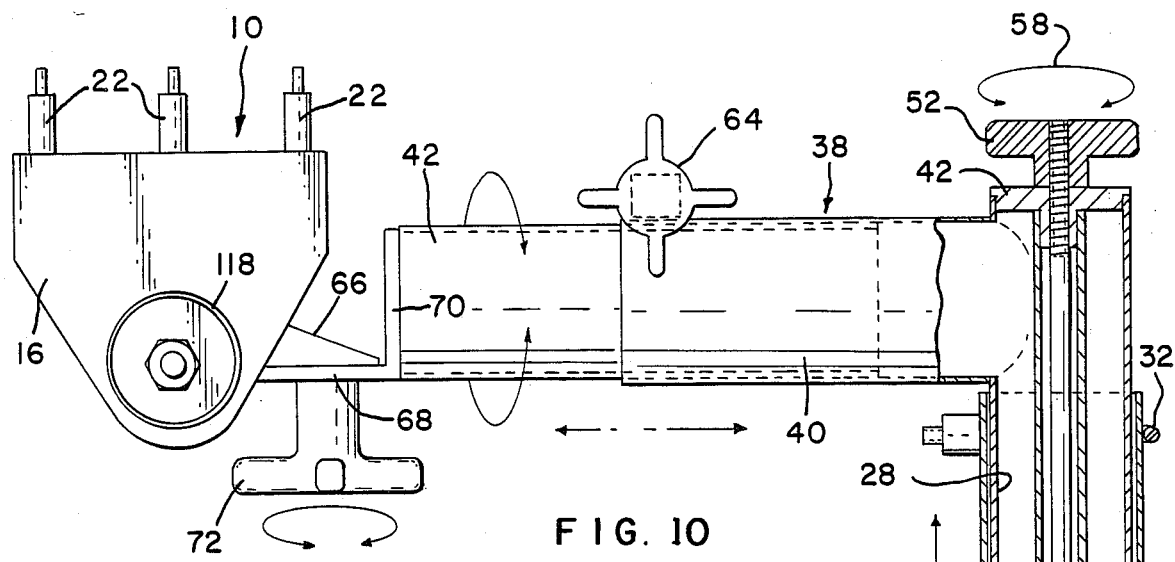
FIG. 10 is a side elevation, partly in vertical section, and showing vertical post-like support means adapted for vertical adjustment and from which a supporting arm extends from one end and the opposite end of said arm supporting said work holding device, the view also lines and arrows indicating possible movement of the various elements.
Figure 11:
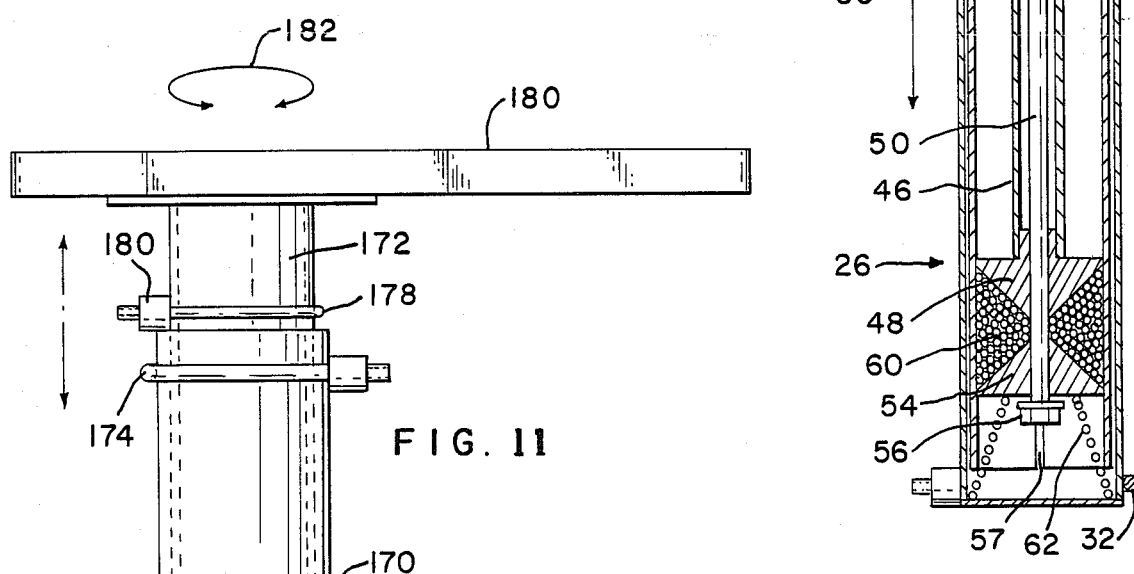
FIG. 11 is a side elevation of an exemplary post-like member which supports a planar table member at the upper end thereof for use adjacent the work holding device illustrated in the preceding figures.

To accomplish any of the foregoing functions, it is preferred that the work holding device 10 be supported by the upper portion of a post-like support 26, best shown in FIG. 10. Said support preferably comprises a pair of coaxial, slidably related tubes 28 and 30, the outer tube 30 being attachable by U-shaped bolts 32 to a leg 34 of a wheelchair 36, shown in phantom, for example, in FIGS. 1–3. Referring to FIG. 10, the inner tube 28 of support 26 extends above the upper end of outer tube 30 and has one end of arm means 38 connected thereto. Arm means 38 also comprises a pair of telescoping coaxial short tubes 40 and 42, the inner tube 42 extending within the outer tube 40. As shown in FIG. 10, the upper ends of the inner tube 28 of support 26 is closed by a cap 44 which is affixed thereto. Depending from and fixed to the inner surface of cap 44 is another tube 46 of relatively small diameter and affixed to the lower end thereof is a conical plug 48. Coaxially within the tube 46 is a rod 50, the upper end of which extends through a suitable hole in cap 44 and said upper end is threaded for engagement by a locking knob 52 which is threaded unto the upper end of rod 50. The lower end of rod 50 extends through a cone 54 and is similar in size to plug 48 and a nut 56 is engageable with the lower end of cone 54. When the knob 52 is rotated in the direction as shown by line 58 and the arrows thereon by which the rod 50 is raised upwardly and thereby compresses the shot 60 within the space between conical plug 48 and cone 54 for purpose of spreading segments of tube 28 as formed by slots 57 in the lower end thereof and thereby clamping tubes 28 and 30 against relative longitudinal movement. Spring 62 engages the cone 54 for purposes of biasing the inner tube 28 and the arm means 38 for purposes of suitable positioning the work holding device 10 at a desired level with respect to a person using the same.

After the inner tube 28 has been adjusted to the desired vertical position within the support 26, the device 10 may be adjusted horizontally to the desired position with respect to support 26 by moving the inner tube 42 of arm 38 relative to the outer tube 40 to a desired position and then lock the two arms together in such position by means of a contracting clamp 64 of conventional type.

The work holding device 10 has a bracket 66 extending from one side thereof a limited distance and abuts the leg 68 of an L-shaped bracket 70, the vertical leg of which is affixed to the outer end of inner tube 42 of arm 38. The bracket 66 is affixed to a pivot pin, not shown, which is threadably engaged by a locking knob 72 that is rotatable in opposite directions as indicated by the arrows adjacent the same. Referring to FIG. 2, the circular direction lines 74 indicate that the device 10 may be rotated if desired, 180 degrees with respect to the pivot attached to bracket 66, as described above.

Immediately above, the mechanism is described by which the work holding device 10 may be positioned substantially universally in any desired location or direction, best suited for use by a handicapped person or a patient. Details of the mechanism within the housing 16 will now be described with respect to FIGS. 5 and 6. In said figures, approximately, the left-hand half of housing 16 comprises an outer tubular portion 76 within which an inner tubular member 78 is coaxially slidable. The left-hand end of the inner tubular member 78 receives and is affixed by brazing to a circular plate 82 disposed between clamping member 20 and plug 80. Secured against the outer surface of plate 82 is the clamping jaw 20 which is affixed by screws 84 which are threaded into the plug 80. From FIGS. 5 and 6, it will be seen that the inner face 86 of clamping member 20 is opposed to parallel face 18 on the wall 88 which defines the left-hand end of the housing 16 as viewed in FIGS. 5 and 6.

Figure 5:
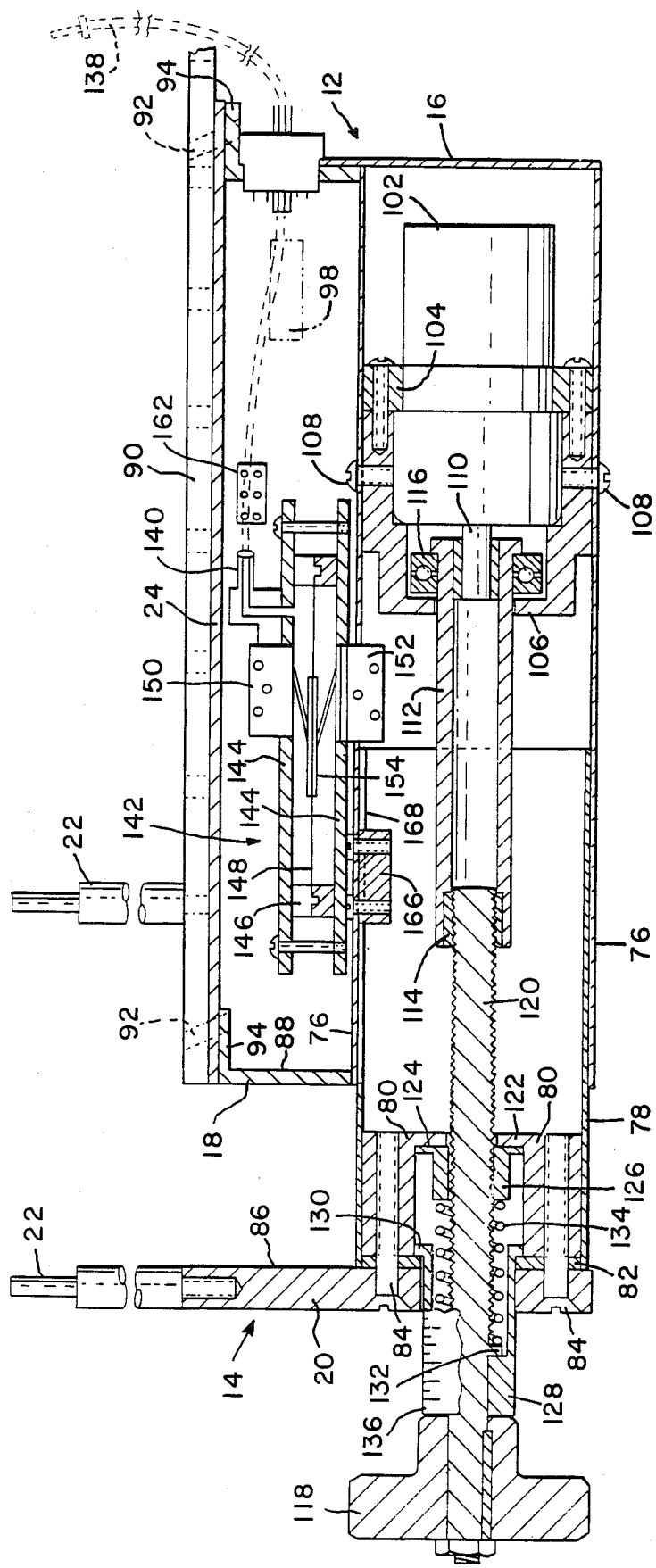
FIG. 5 is a side elevation shown in vertical section of the work holding device comprising the present invention and illustrated with the clamping mechanism being spaced for the reception of an object.
Figure 6:
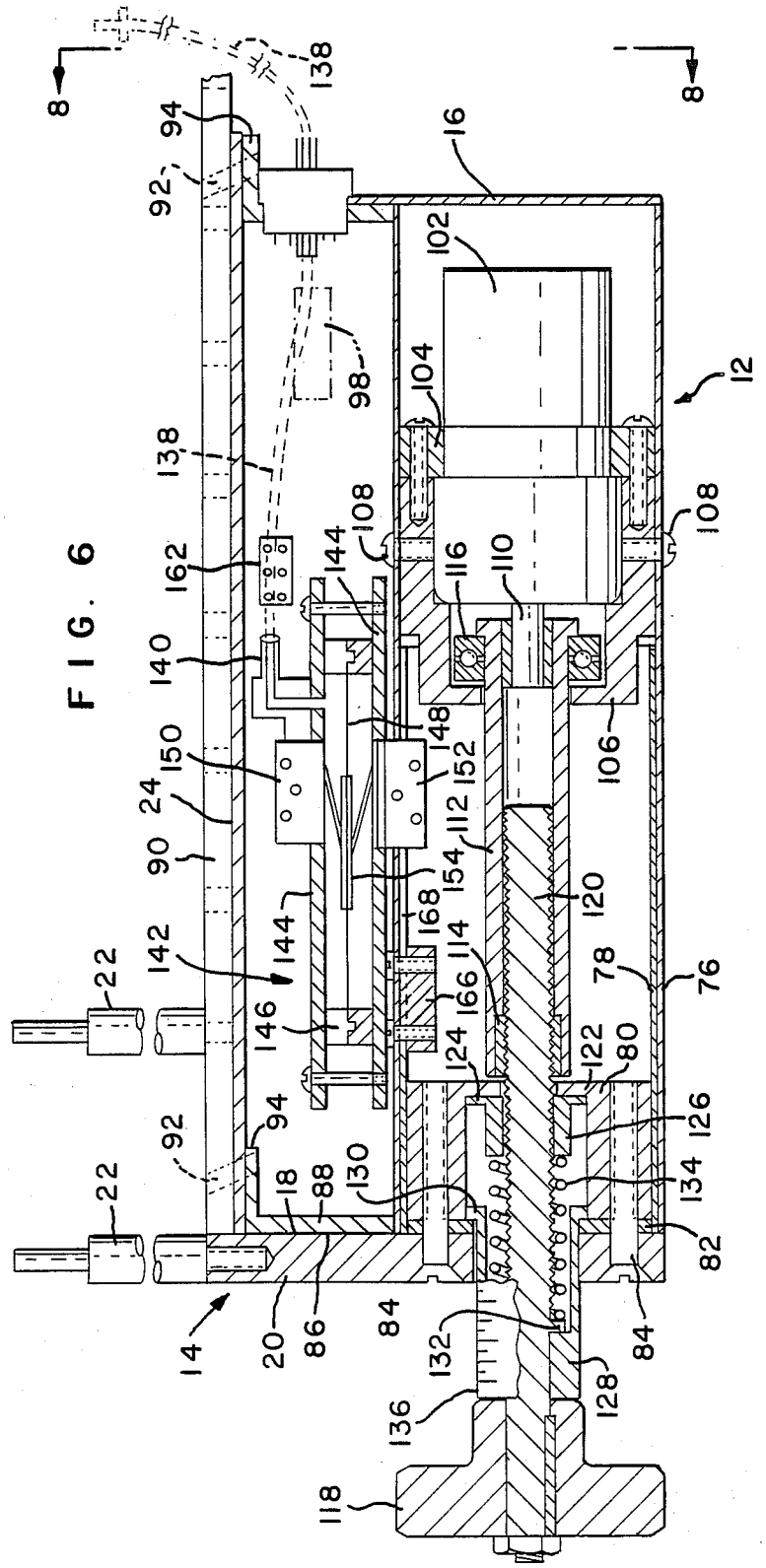
FIG. 6 is another sectional view similar to FIG. 5 but illustrating the clamping means in full gripping position with abutting faces thereof in contact.
Figure 7:
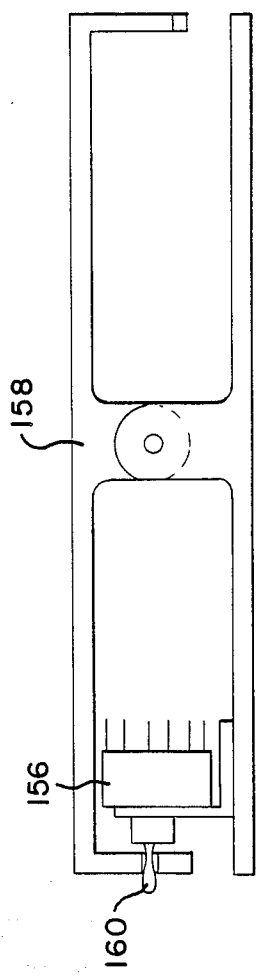
FIG. 7 an exemplary side view of a foot-operated electric switch, the switch being in "Off" position as shown therein.
Figure 8:
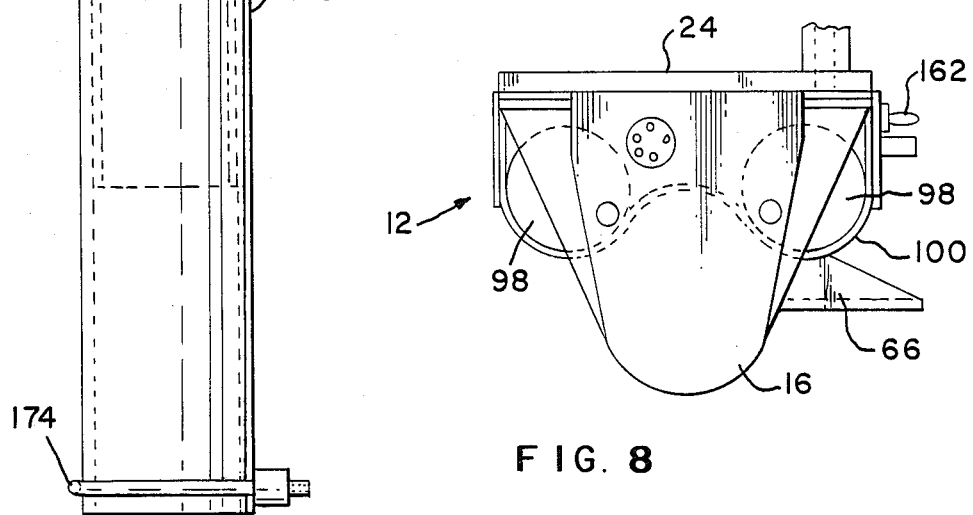
FIG. 8 is an end view of the work holding device shown in FIG. 4, as seen from the right-hand end thereof.

The inner tubular member 78 is slidable in opposite directions relative to the outer tubular portion 76 of housing 16, thereby effecting movement between the clamping faces 18 and 86, as well as between the supplemental clamping members 22 respectively adjustably positionable upon clamping member 20 and planar supporting member 90. Member 90 is detachably affixed to the upper surface 24 of housing 16 by means of a number of diagonally affixed pins 92 which extend into complementary holes in supporting member 90, the pins extending upward from flanges 94 affixed to suitable portions of housing 16 at the forward and rearward ends thereof, as clearly shown in FIGS. 5 and 6. Supported within the right-hand portion of housing 16, as shown in FIGS. 5 and 6, is an electric motor 102 of the type operable by, preferably, rechargeable batteries 98, which are symbolically illustrated in FIGS. 5 and 6 by phantom outlines, while the same are otherwise shown in actual manner in FIG. 8, wherein they are shown positioned in the right-hand end portion of housing 16 and secured therein by suitable flexible straps 100. Said batteries energize electric motor 102 which, by way of illustration and without restriction thereto, comprises a three volt DC permanent magnet gear motor, preferably with a 68:1 gear ratio with a no load gear box output speed of 130 rpm. The output torque of said motor is 15 inch lbs. Said motor is affixed by a retaining ring 104 which, in turn, abuts one end of a cup-shaped motor bushing 106 which is attached to outer tubular portions 76 of housing 16 by means of screws 108.

The motor has an output shaft 110 which is affixed by a bushing to the innermost end of a hollow, tubular screw nut assembly 112, the opposite end of which contains an internally threaded bushing 114, which is affixed thereto for rotation thereby and preferably composed of bronze. Thrust bearing 116 absorbs thrust forces when imposed upon the screw nut assembly 112, operation of which now is described below.

Manual clamping operator knob 118 is keyed to the outer end of threaded shaft 120, the shaft being threaded complimentarily to the threaded bushing 114 and engageable therewith. The circular plug 80 has an inner circular flange 122 against which a flange 124 on sleeve 126 abuts. An additional elongated tubular member 128 surrounds the shaft 120 adjacent the knob 118 and extends to the right therefrom, as viewed in FIGS. 5 and 6, through an opening in clamping member 20, as clearly shown in said figures, and the inner end of tubular member 128 is provided with a radial flange 130, which abuts the inner surface of the thin circular plate 82. Surrounding the shaft 120 and extending between the inner end of sleeve 126 and a radial flange 132 on shaft 120 is a coiled compression spring 134. All closing forces applied to jaw 20 are effected by the compression of spring 134.

The exterior surface of the tubular member 128 has pressure-indicating gradients 136 thereon, which are readable with respect to the outer surface of clamping member 20 through which the tubular member 28 extends.

As indicated above, the motor 102 and the no load gear box effects an output speed of exemplary 130 rpm and has an output torque of 15 inch lbs. at stall. The force-indicating gradients 136 are calibrated, for example only, to read in five pound increments and are indicative of the compressive force of spring 134 which, when it reaches 50 p.s.i., the motor will stall. However, if greater clamping force is desired, the manually-operable clamping knob 118 is rotated in a direction to cause greater clamping force to be applied by the clamping members upon an object, up to a pressure, for example, as great as up to 500 p.s.i., the ultimate pressure being limited only by the ultimate strength of threaded rod 120 and internally-threaded bushing 114. In view of the foregoing and the fact that all clamping forces are applied through spring 134, it will be seen that clamping of object occurs under monitored and controlled pressure.

FUNCTIONS OF THE CLAMPING MEMBERS

As the reversible motor 102 rotates in the direction to separate the clamping faces 18 and 86, as well as the supplemental clamping member 22, respectively on clamping member 20 and supporting member 90, flange 130 on tubular member 128 engages the rim of the circular plate 82 which is affixed to clamping member 20 and causes the same to move to the left as viewed in FIGS. 5 and 6, thereby spacing the clamping faces 18 and 86, as well as the supplemental clamping members 22 respectively on member 20 and supporting member 90. Such movement is caused by the rotation of tubular screw nut assembly 112 upon the threaded shaft 120, such movement being effected by operation of the motor 102. Switch means, described hereinafter, control the function of the reversible motor 102 respectively in opposite directions. When it is desired to move either the clamping surfaces 18 and 86 toward each other, such as for purposes of clamping a book or any number of other suitable things therebetween, the various clamping means are moved toward each other by the reverse operation of motor 102 and such rotation of the motor in desired direction is effected by one of a plurality of different switches, details of which are as follows:

As indicated above, the present clamping means may be moved as desired by one of several types of different switches in the circuit which controls the flow of current to the motor from the batteries 98. For example, clamping movement of member 20 toward clamping face 18 may be effected by a person blowing air or withdrawing his breath through a tube illustrated, for example, in FIGS. 1, 5 and 6. One end of the tube is connected to an inlet port 140 extending from breath-operated switch 142, details of which are clearly shown in FIGS. 5 and 6, and to which attention is directed. Switch 142 comprises upper and lower plates 144, between which enclosing sidewalls 146 extend to provide a completely enclosed member. Extending between the sidewalls 146 in taut manner is a flexible diaphragm 148. Similar switches 150 and 152 respectively are supported by the opposite plates of the breath-operated switch 142. Said switches are connected in circuit with the motor 102 and the batteries 98 in such manner that one switch will cause the motor to rotate in one direction, such as to effect separation of the clamping members, while the other switch will cause the motor to rotate in the opposite direction and thereby effect clamping movement of said clamping members. From FIGS. 5 and 6, it will seen that the switches 150 and 152 each have an angularly directed actuating arm which abut or are connected to rigid means 154 affixed substantially centrally to the diaphragm 148. When a handicapped person blows his breath into the tube 138, the rigid means 154 will move to a lower position than that shown in FIGS. 5 and 6 and thereby actuate, for example, switch 152 which will cause motor 102 to operate, for example, in clamping direction. When, however, a person sucks upon the tube 138, it will decrease the pressure in the upper portion of switch 142 and thereby cause the rigid means 154 to rise in the switch 142 as viewed in FIGS. 5 and 6 and thereby actuate the switch 150, which will cause the motor 102 to operate in clamp-releasing direction.

The motor 102 also is adapted to be actuated by foot movement; a foot-operated switch 156 is employed by a pivoted, foot-operated treadle member 158, shown respectively in FIGS. 1-3 and 7. The switch 156 is a double-pole, double-throw momentary type spring return switch, which returns the actuating member 160 to central, "Off" position, which is that illustrated in FIG. 7. The treadle 158 is operated by a person applying his toe either to the left-hand portion or the right-hand portion of the treadle 158, as viewed in FIG. 7. When one portion is depressed, the switch lever 160 will be moved in one direction to cause the motor 102 to operate in one rotary direction, while when the opposite side of the treadle is depressed, the switch lever 160 will be thrown in the opposite direction and thereby cause the motor 102 to operate in a reverse rotary direction, said directions respectively effecting clamping or release movement of the clamping member 20 of the secondary member 14 with respect to the clamping face 18 of the base member 12.

Figure 9:
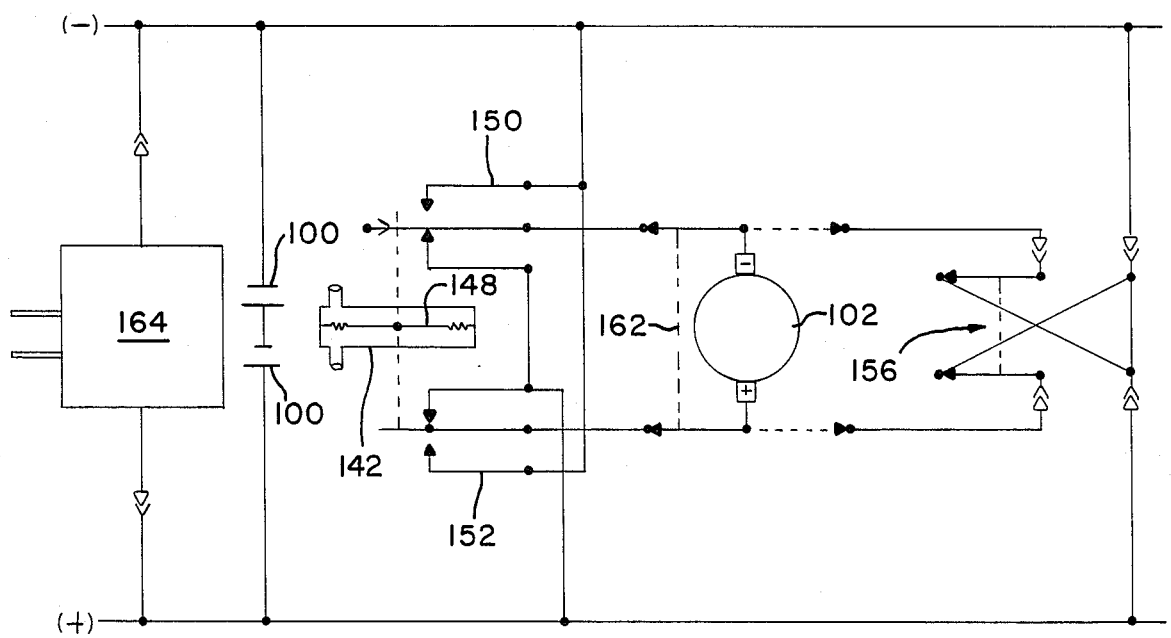
FIG. 9 is an electrical diagram of the control and actuating mechanism of the work holding device comprising the present invention.

To determine and control whether the breath-control switch 142 or the foot-control switch 156 is to be operated, the circuitry is provided with a mode control switch 162, which is illustrated in exemplary manner in FIGS. 5 and 6, as well as being included in the circuitry of FIG. 9.

Referring to FIG. 9, a battery charger 164 is adapted to be plugged into the socket of a conventional 110 volt circuit and operates to charge the batteries 98 to a full 3-volt capacity. Breath-operating switch 142 is shown with diaphragm 148 and switches 150 and 152 having contacts which operate, depending upon whether suction or pressure is exerted against diaphragm 148 to rotate motor 102 in a direction to effect clamping operation, or conversely, to effect separation of the clamping members. In the right-hand portion of FIG. 9, foot-operated switch 156 is illustrated in a manner to show that when the actuating lever 160 thereof is moved in one direction, the motor 102 rotates in one direction, such as in a manner to effect clamping operation, while when the switch actuating member 160 is moved in the opposite direction, the circuitry to motor 102 is changed to effect separation of the clamping members with respect to each other. Essentially, the wiring illustrations in the circuit of FIG. 9 are substantially of commonplace nature.

In view of the fact that the outer and inner tubular portions 76 and 78 of the base member and secondary member are longitudinally slidable, means are provided to prevent relative rotation thereof with respect to each other about the axis of said tubular members, said means comprising a simple construction in the form of a guide lug 166, which is affixed by rivets or otherwise to outer tubular portion 76 of base member 12, said lug being slidable within a slot 168 of limited length formed in the inner tubular member 78.

When operating the work holding device 10, it sometimes is convenient to have additional supporting means to accommodate articles or items used by a handicapped person when clamping another object upon the planar supporting member 90 of device 10. To fulfill this situation, by reference to FIGS. 1-3 and 11, it will be seen that an additional post 170 of preferably vertical nature is provided in the form of a tube which receives a second tube 172 therein, which projects above the upper end of post 170. U-bolts 174 are proposed for connection of the post 170 to a leg 176 of the wheelchair 36, shown in FIG. 1. Another U-bolt 178 or the like is clamped to the upper portion of the second tube 172 at a desired distance below the upper end thereof to provide the supplemental horizontal support 180 with a suitable elevation such as adjacent the work holding device 10, as shown in FIG. 1. A conventional clamping bar 180 is secured by suitable nuts or the like to the U-bolt 178 and rides upon the upper end of additional post 170 in a manner that will permit the supplemental support member 180 to rotate about the vertical axis of the additional post 170, such as in a manner indicated by the indicating line 182 and the arrows thereon.

From the foregoing, it will be seen that the present invention comprises a work holding device for use by an incapacitated person, such as one having only a single usable hand for purposes of firmly holding, by clamping action, a wide variety of objects with which the person may work or operate to their amusement or benefit and possible enjoyment. Though the clamping mechanism is operated by a battery, the same preferably is of the type which can be recharged and the circuit includes a charging unit insertable into a conventional 110 volt electric outlet. Several different types of clamping mechanisms are embodied. Further, two different types of operating means are included, one being operated by human breath, either in blowing or sucking manner, or a second device which may be operated by a foot of the handicapped person.

While the invention has been described above, the foregoing illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A work holding device for handicapped persons comprising in combination,
    a. a base member having object-engaging means thereon,
    b. a secondary member supported for movement toward and from portions of said base member,
    c. object-engaging means on said secondary member cooperable with object-engaging means on said base member to secure an object therebetween by monitored and controlled pressure,
    d. reversible electric motor means supported by one of said base or secondary members and having a drive shaft connected to screw means coengageable with a threaded bore carried by the other of said members and operable to rotate one of said members relative to the other and thereby effect relative movement of one of said members toward and from the other to clamp or release an object between said object-engaging means at monitored pressure provided by a yieldable spring extending between said screw means and the object-engaging means on said secondary member,
    e. electric switch means connected between a source of current and said motor, and
    f. actuating means for said switch operable selectively by human body means to effect movement of said object-engaging means toward and from each other.

2. The work holding device according to claim 1 further including means to affix said device to a support having means to support the body of a handicapped person.

3. The work holding device according to claim 2 in which one of said base or secondary members is affixed to said support and the other member is movable toward and from the support.

4. The work holding device according to claim 3 in which said base member is affixed to said support and said reversible electric motor is affixed thereto.

5. The work holding device according to claim 4 in which said base member includes guide means to support and guide said secondary member for movement relative thereto.

6. The work holding device according to claim 5 in which said guide means comprises coaxial means slidable non-rotatably relative to each other.

7. The work holding mechanism according to claim 6 further including key and slot means respectively on said slidable coaxial means to prevent relative rotation therebetween.

8. The work holding mechanism according to claim 1 further including manually-operable auxiliary means attached to said screw means and operable to exert greater gripping pressure between said object-engaging means than that which said electric motor is capable of exerting.

9. The work holding mechanism according to claim 1 in which said base member is attachable adjustably to support means connectable fixedly to a support for a handicapped person in the class of beds, chairs and wheelchairs, said human body means comprises a human mouth and a human foot, said actuating means for said switch being attached respectively to foot-engageable means on said bed, chair or wheelchair and breath-conveying means positionable in the human mouth, additional switch means respectively operable either by a human foot or breath to blow or inhale and thereby activate said electric motor in a desired direction of rotation, and a mode switch in circuit with said additional switch means and operable to cause operation of said electric motor by a human foot or breath.

10. The work holding mechanism according to claim 9 in which said additional foot-operated switch is a double throw type attachable to a bed or a footrest on a wheelchair and said breath-operated additional switch comprises a diaphragm movable by blowing breath or effecting suction and thereby causes said electric motor to close or separate said object-engaging means.

11. The work holding device according to claim 1 in which said base member has a substantially planar surface adapted to support an object thereon to be clamped by said additional object-engaging elements when disposed upon said surface.

12. The work holding device according to claim 1 further including a substantially vertical post-like support attachable to a person-supporting object of the class of beds, chairs and wheelchairs, said support being substantially vertical and including vertically adjustable parallel members securable in adjusted position, and means on the upper end of one of said members to attach said base member of said device thereto.

13. The work holding device according to claim 12 in which said means on the upper end of one of said members is an arm secured at one end to and extending transversely from said vertical support and is rotatable about a horizontal axis and also is longitudinally adjustable relative to said axis, and said means including locking mechanism to secure said base member in a selected adjusted position upon the upper end of said post-like support.

14. The work holding device according to claim 13 in which said base member is secured to the opposite outer end of said arm by a horizontal bracket extending from one side of said base member, and a pivot member connecting said bracket to said outer end of said arm to permit movement of said base member about the axis of said pivot member, whereby said base member has substantially universal positioning possibilities with respect to said vertical post-like support.

15. The work holding device according to claim 1 in which said base member comprises a housing provided with an object-supporting upper surface and contains said electric motor and screw means, said housing also including tubular means extending longitudinally therein and coaxially enclosing a complementary tube longitudinally adjustable along the axis of said coaxial tubular members and within which said screw means and threaded bore are enclosed for operation by said motor.

16. The work holding device according to claim 15 further including a breath-operated switch supported within said housing and connected to said motor.

17. The work holding device according to claim 1 further including a substantially vertical post-like support attachable to a person-supporting means for use by said person, and means adjustably connecting said base member to the upper end of said support, said means being arranged for substantially univeral adjustment of said base member relative to said post-like support.

18. The work holding device according to claim 17 further including another substantially vertical support attachable to another portion of said person-supporting means, and a substantially planar surface member secured to the upper end of said another support and adapted to support various objects for use by said person in conjunction with the use of said base member and objects clamped thereto.

19. The work holding device according to claim 18 in which said person-supporting means is in the class comprising chairs, benches, wheelchairs and beds.

20. A work holding device for handicapped persons comprising in combination,
  a. a first member having object-engaging means thereon,
  b. a second member having object-engaging means thereon, cooperable with the object-engaging means on said first member,
  c. reversible electric motor means interconnected to one of said members and having a drive shaft,
  d. co-engaging externally and interiorly threaded members,
  e. means connecting one of said threaded members to said motor shaft for rotation thereby respectively in opposite directions to move said object-engaging means toward and from clamping position, with respect to an object,
  f. a compression spring operable between one of said threaded members and one of said first and second members operable to effect yieldable pressure between the object-engaging means respectively on said members,
  g. a switch connected between a source of power and said reversible electric motor, and
  h. switch-actuating means selectively operable by human body means of a handicapped person to effect rotation of said motor in a desired direction respectively to move said object-engaging means to or from clamping position, whereby said clamping pressure is controlled within safe limits.

21. The work holding device according to claim 20 in which said switch-actuating means is operable by human breath.

22. The work holding device according to claim 20 in which said switch-actuating means is operated by a human appendage.

23. The work holding device according to claim 20 further including a pressure-indicating scale of gradients connected to one of said first and second members and operable visually to indicate the degree of pressure being generated by operation of said motor and co-engaging threaded means, whereby said clamping pressure is visually monitored.

24. The work holding device according to claim 20 further including mannually-operable means connected to one of said first and second members to effect additional clamping pressure in excess of that capable of being exerted by operation of said motor.

* * * * *